Oct. 9, 1928.

I. M. CALDWELL 1,687,426

TIRE RIM

Filed Aug. 17, 1927

Iva M. Caldwell,
INVENTOR

BY Victor J. Evans
ATTORNEY

WITNESS:

Patented Oct. 9, 1928.

1,687,426

UNITED STATES PATENT OFFICE.

IVA M. CALDWELL, OF MARYVILLE, MISSOURI.

TIRE RIM.

Application filed August 17, 1927. Serial No. 213,647.

This invention relates to demountable rims for motor vehicles and the like and its general object is to provide a demountable rim that can be easily and expeditiously applied and removed from a tire in a minimum amount of time with very little effort on the part of the operator and without the use of tools or the like.

A further object of the invention is to provide a demountable rim of the collapsible sectional type, that is extremely simple, durable and inexpensive to manufacture, and will securely maintain a tire in proper position thereon without fear of collapsing or causing damage to the tire, whether it be the pneumatic type or otherwise.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which.

Figure 2:
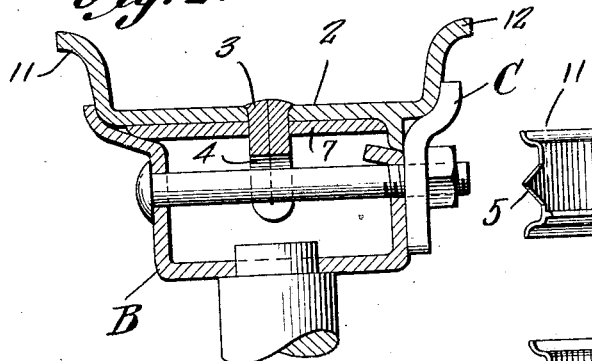
Figure 2 is a sectional view taken on line 2—2 of Figure 1.

Referring to the drawings in detail the letter A indicates a vehicle wheel which includes the usual felly B and the rim lugs C which operate to retain the rim upon the felly B as clearly shown in Figure 2 of the drawings.

The above forms no part of the present invention which resides solely in the rim disclosed and said rim includes a plurality of sections preferably three in number as shown and two of these sections are of similar formation as indicated by the reference numeral 1 while the remaining section is indicated by the reference numeral 2 and has formed centrally thereof and projecting from its inner surface a tongue 3 which is formed with a recess 4 adapted to accommodate one of the bolts as best shown in Figure 2 to prevent creeping of the rim upon its felly as will be readily apparent.

Figure 1:
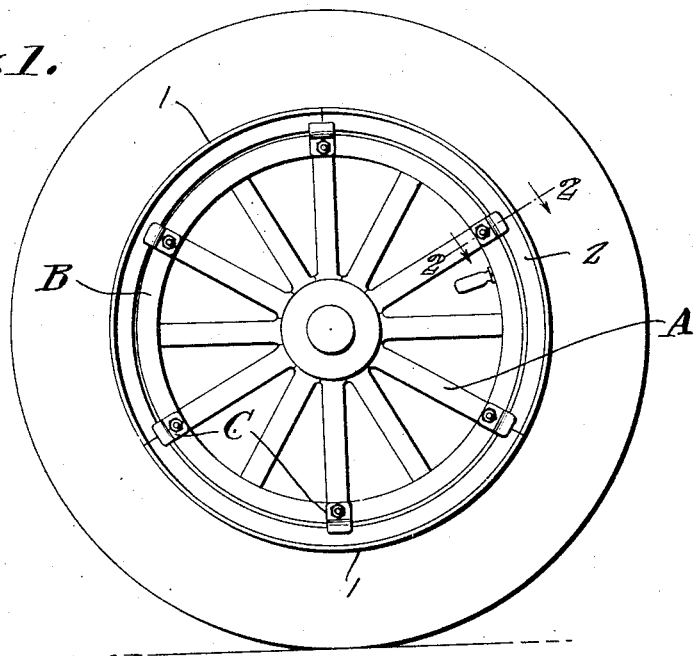
Figure 1 is a side elevation of a vehicle wheel showing my novel rim in operative position.
Figure 3:
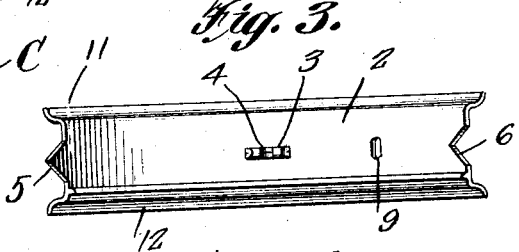
Figure 3 is an inner plan view of one section of my novel rim.
Figure 4:
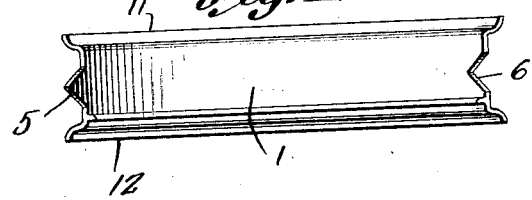
Figure 4 is a similar view of another section thereof.
Figure 5:
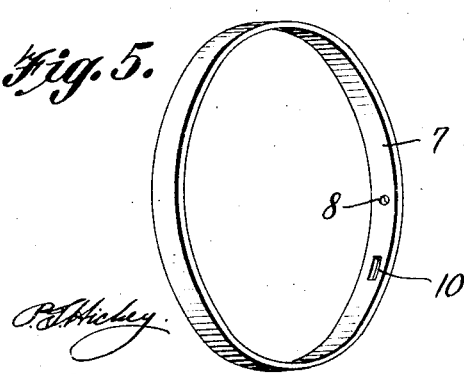
Figure 5 is a perspective view of the locking band which forms a part of the present invention.

Each of the sections including the section 2 is provided with a substantially V-shaped tongue 5 formed on one end thereof as best shown in Figures 3 and 4 of the drawings and these tongues 5 are adapted to be accommodated in substantially V-shaped recesses 6 formed on the opposite ends of the sections, when the said sections are associated in rim formation as shown in Figure 1 of the drawings. It will be obvious that this tongue 5 and recess connection prevents lateral movement of the sections when so associated.

In order to retain the sections in cooperative association, I provide an annular band 7 which is of a diameter to snugly fit the inner periphery of the sections when they are arranged in rim formation. The band 7 is provided with an opening 8 adapted to register with the opening 9 in the rim section 2, and said band is further provided with a slot 10 to accommodate the tongue 3 as shown in Figure 2.

The rim sections are provided with the customary flanges 11 and 12 upon their opposite side edges so as to accommodate the tire beads in the usual manner as will be readily apparent.

From the above description and disclosure in the drawings it will be obvious that I have provided a demountable rim of the sectional type which includes a number of sections adapted to be associated in rim formation and held in such formation through the instrumentality of the band 7. By this construction, the rim can be easily and expeditiously applied and removed from a tire with very little effort and in a minimum amount of time it being apparent that all that is necessary in applying the rim to a tire is to insert the rim sections 1 and 2 in rim formation therein with the tongues 5 in their companion recesses 6 and then apply the band 7 in the manner as above set forth.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A rim of the character described comprising a plurality of sections arranged in end to end relation in rim formation, tongues formed on each of said sections and received in recesses also formed therein, tire bead flanges formed with the side edges of each section, a recessed tongue extending centrally and inwardly from one of said sections, an annular band formed with a slot receiving said recessed tongue and securing said sections in rim formation, and said last mentioned section and band respectively being provided with openings arranged in registration.

In testimony whereof I affix my signature.

IVA M. CALDWELL.